UNITED STATES PATENT OFFICE.

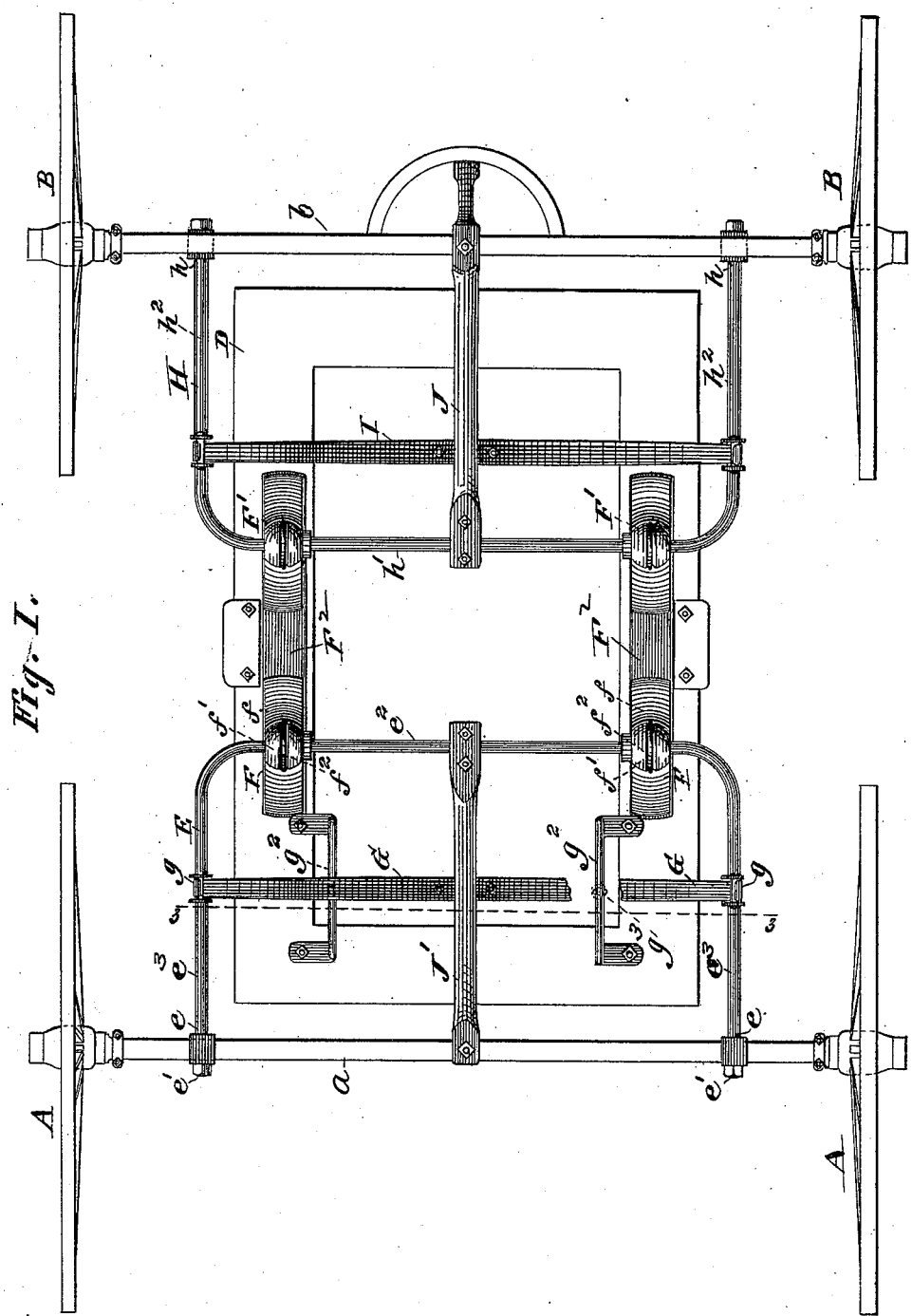

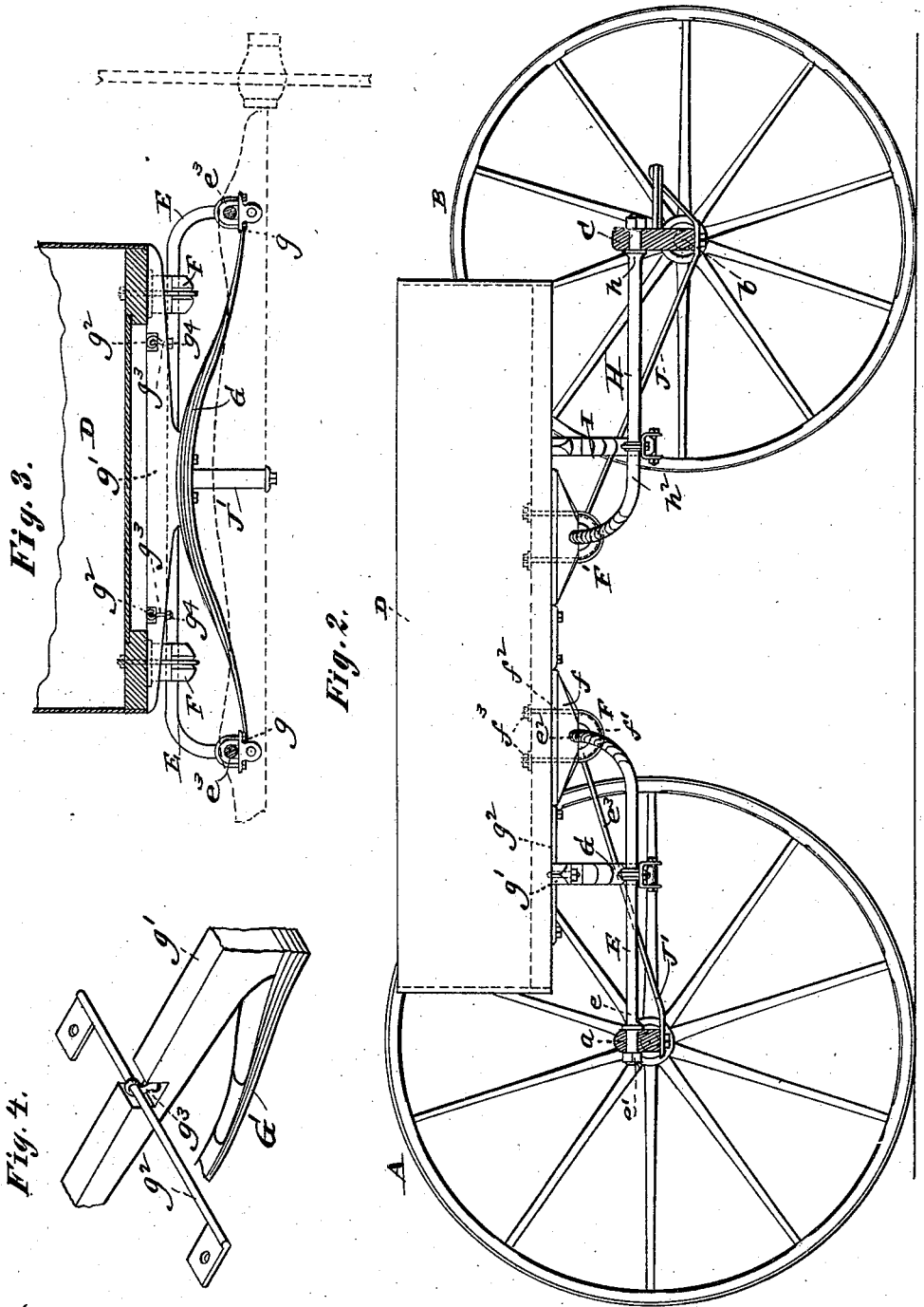

MARTIN MEDART, OF BELLEVILLE, ILLINOIS, ASSIGNOR OF ONE-HALF TO MARTIN V. MEDART, OF ST. LOUIS, MISSOURI.

VEHICLE.

SPECIFICATION forming part of Letters Patent No. 418,650, dated December 31, 1889.

Application filed September 13, 1889. Serial No. 323,863. (No model.)

*To all whom it may concern:*

Be it known that I, MARTIN MEDART, of Belleville, St. Clair county, Illinois, have made a new and useful Improvement in Vehicles, of which the following is a full, clear, and exact description.

The improvement relates more especially to four-wheeled vehicles whose bodies are elastically supported; and it consists, substantially, as is hereinafter set forth and claimed, aided by the annexed drawings, making part of this specification, in which the most desirable mode of carrying out the improvement is exhibited, and of which—

Figure 1 is a bottom view of the improved vehicle; Fig. 2, a side elevation of the vehicle; Fig. 3, a vertical cross-section on the line 3 3 of Fig. 1, and Fig. 4 a detail, being a view in perspective, looking upward, and exhibiting the means employed in adjusting the elastic support at the rear end of the vehicle. Similar means are employed at both sides of the rear end of the vehicle. The last-named view is upon an enlarged scale, and the same letters of reference denote the same parts.

Saving as it may be modified or supplemented by the improvement under consideration, the vehicle is of any of the customary forms consistent with the nature of the improvement—that is, the hind wheels A A, hind axle $a$, front wheels B B, front axle $b$, bolster C, and body D, as well as minor details therewith immediately connected, are made in the usual manner and do not need further description.

E, Figs. 1, 2, and 3, represents a U-shaped bar. It serves to unite the hind axle $a$ with the hind portion of the body D. Its ends $e\ e$ are attached to the hind axle in any suitable manner—say, by projecting them between the upper (wooden) portion and the lower (metal) portion of the axle and securing them therein by means of nuts $e'$ and clips. The middle portion $e^2$ of the bar is journaled in bearings F F, attached to the body D. These bearings are secured to the under surfaces of the side rails of the body, and their preferable form is the box $f$, whose cap $f'$ is secured to the box by means of the clip $f^2$, which passes upward through the bottom $d$ of the body, and fastened by means of the nuts $f^3$, substantially as shown.

The arms or sides $e^3\ e^3$ of the bar E are of springy material—such as steel—although the improvement may in part be carried out by means of rigid sides $e^3\ e^3$. An element of the construction is some elastic part in the nature of a brace and tie interposed between the bar E and the body D, and at a point between the portion $e^2$ of the bar E and the hind axle. The most desirable form of such part G is the half-elliptic spring, shown connected at its ends $g\ g$ by means of clips to the sides $e^3\ e^3$ of the bar E, and at its center to a block $g'$, which in turn is secured to the body D, substantially as shown—that is, any shock proceeding from the hind wheels is received first upon the bar E and thence upon the spring G, and this spring may be fixed at some point along the length of the bar sides $e^3\ e^3$, and the improvement is carried out; but to enable the spring to be adjusted to cause the support at the rear end of the body to be more or less elastic the head-block $g'$ is made adjustable upon the body D, so that the spring G can be set nearer to or farther from the hind axle. To this end, there are elongated bearings $g^2$ upon the under side of the body D, from which the block $g'$, by means, say, of the hooks $g^3$, Fig. 4, is suspended, and so that the block carrying the spring can be slipped from end to end thereof and by means of the nut $g^4$ tightened at any desired point thereon.

H represents a U-shaped bar, analogous to the bar E and similarly connected—that is, its ends $h\ h$ are attached to the bolster C of the front axle, and its middle portion $h'$ is journaled in bearings F' F', attached to the body D, and similar to the bearings F F—and I represents a spring similar to the spring G, and used for an analogous purpose—namely, to provide an elastic support for the forward end of the body D upon the sides $h^2\ h^2$ of the bar H. The spring G, however, is preferably not adjustable toward and from the front axle, but remains fixed at the same point upon the bar sides $h^2\ h^2$.

By means of the above-described connection of the front and hind wheels with the vehicle-body several advantages are obtained. Any shock sustained by the wheels is largely, if not wholly, dissipated before reaching the vehicle-body; the vehicle-body rides evenly, although the load may be unevenly placed therein, and the body is not noticeably tilted sidewise by reason of the load being at one side of the body or when a person is stepping into the body from the side thereof, and the entire gear is light-running and neat in appearance, and the construction is a comparatively economical one. No perch is necessary; but, if desired, a safety-bar J may lead from the front axle to the middle portion of the bar H, as shown, and a similar bar J' may connect the hind axle with the middle portion of the bar E. The bars E H in effect take the place of the customary perch. At each side of the body D the bearings F F' are united by means of a plate $F^2$, which in turn is secured to the body.

The clip $f^2$ is a convenient means for uniting the parts F F' $F^2$ together and to the body D, as shown.

I claim—

1. The combination, with the vehicle-body and the front and rear axles thereof, of the front U-shaped bar H, connecting the front axle and the body, the rear U-shaped bar E, connecting the rear axle and the body, the bearings F F', in which said bars respectively are journaled and which are connected together on each side by the metal plates $F^2$, secured to the under surfaces of the side rails or beams of the vehicle-body, the clips $f^2$ and nuts $f^3$, the fixed spring I under the bar H, and the spring G under the bar E and adjustable longitudinally in reference to the wagon and the elongated bearings $g^2$ on the under side of body D, from which the block $g'$ is suspended, substantially as specified.

2. The combination, with the vehicle-body and the front and rear axles thereof, of the front U-shaped bar H, the rear U-shaped bar E, the bearings F F' for said bars, connected on each side by plates $F^2$, the front fixed spring I, the rear adjustable spring G, and the safety or stay bars J J', the former leading from the front axle to the middle of the bar H and the latter in like manner connecting the hind axle with the middle of the bar E, constructed and arranged substantially as and for the purposes specified.

Witness my hand this 31st day of August, 1889.

MARTIN MEDART.

Witnesses:
WILLIAM E. SIEFERT,
GEO. C. REBHAN.